United States Patent [19]

Heimburg

[11] 3,748,542

[45] July 24, 1973

[54] CONTROL SYSTEM

[75] Inventor: Erhardt H. Heimburg, Flint, Mich.

[73] Assignee: Industrial Electronic Timer Co., Cheboygan, Mich.

[22] Filed: May 24, 1971

[21] Appl. No.: 146,119

[52] U.S. Cl. ............................................ 317/141 S
[51] Int. Cl. ........................................... H01h 47/18
[58] Field of Search ...................... 317/141 S, 142 R

[56] References Cited
UNITED STATES PATENTS
2,563,828  8/1951  Fahriver ........................... 317/142 R
3,178,619  4/1965  Winchel ........................... 317/141 S Primary Examiner—L. T. Hix
Attorney—Fisher & Schmidt

[57] ABSTRACT

A control system whereby a controller for varying apparatus control devices is instantaneously turned on or off and/or turned on or off after a selected time interval determined by a transistorized timing circuit that has an adjustable time constant.

2 Claims, 2 Drawing Figures

PATENTED JUL 24 1973

3,748,542

INVENTOR.
Erhardt H. Heimburg
BY
Fisher & Schmidt
ATTORNEYS

CONTROL SYSTEM

This invention relates to improvements in control systems of the type providing timed control of apparatus functions.

Controls, e.g., of the type used industrially for automated equipment, are frequently required to provide timed control of operational sequences. Such controls should be easily serviced without requiring special skills and with a minimum of down-time. These controls should be insensitive to the environment, such as dust, dirt, oil, heat, etc., and still be relatively inexpensive. By way of example, often conventional clocks are employed to mechanically or electrically start or stop an operation. Since the repair of a clock requires special skills, the clock would have to be removed and temporarily replaced with another while awaiting the repairs, it being unlikely that one could afford the expense of discarding the clock rather than having it repaired. Hence, there is an investment in standby controls and costly repairs.

With the foregoing in mind, a new and different control system is contemplated for providing timed control of functions electronically with a minimum of relatively inexpensive components.

Also contemplated is a control system having unique circuitry that affords timed control of functions with simplified circuits utilizing relatively inexpensive and readily commercially available components that can, if desired, be discarded once they malfunction.

Other objectives are the provision of a control system for electronically controlling functions that can easily and quickly be repaired; that employs components that can quickly be replaced without special training; that requires a minimum of time for trouble-shooting the malfunctioning components; and that can provide either timed on or timed off control of the functions as well as instantaneous turn-on or turn-off.

The foregoing and other objects and advantages of the invention will become apparent from the following description and from the accompanying drawings in which.

Figure 1:
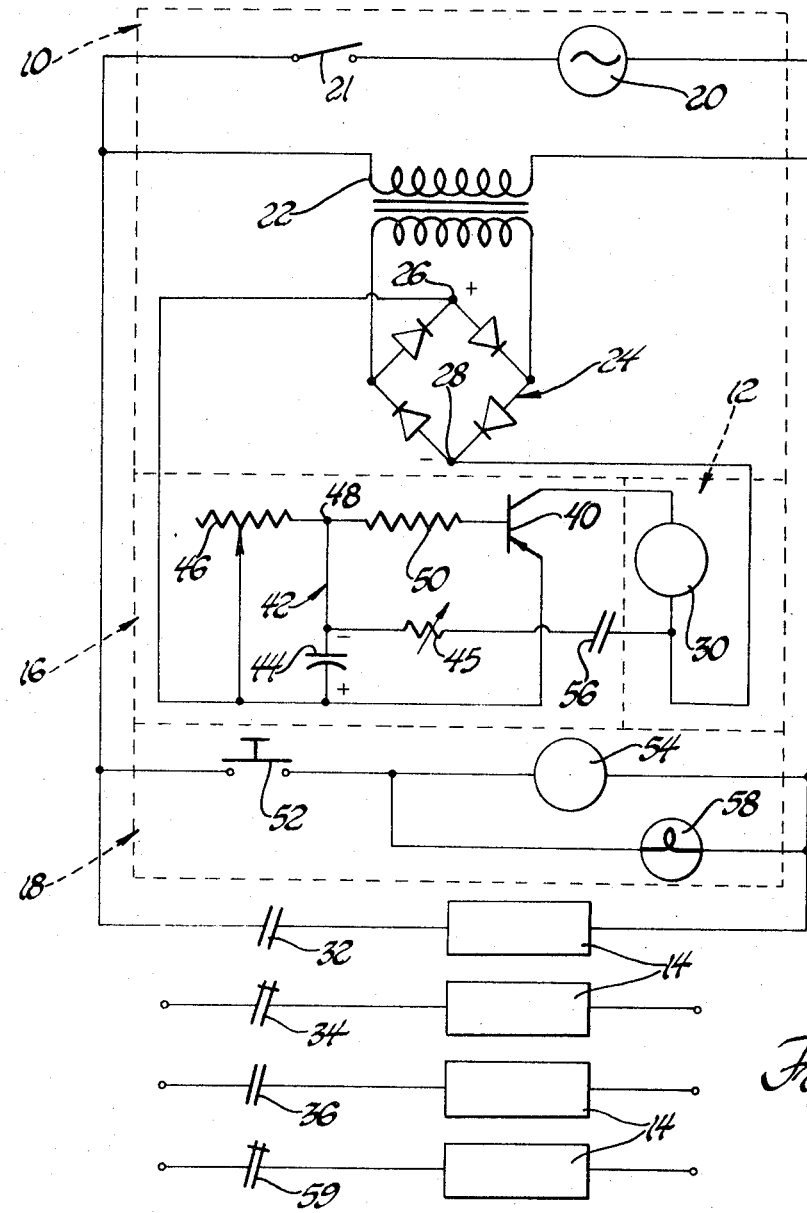
FIG. 1 is a schematic circuit diagram of a control system incorporating the principles of the invention.

Referring first to FIG. 1, the control system depicted has a power source denoted generally by the numeral 10 and a function controller shown generally at 12. The function controller 12 operates one or more apparatus control devices 14, which may be of the industrail type that initiate the different functional steps for automated machinery after certain time intervals. The control of the time interval is the function of a timing circuit viewed generally at 16. This timing circuit 16 is selectively rendered operative by an initiation device shown generally at 18.

The power source 10 has an AC power supply 20, which can be a conventional line power source or a separate motor-generator set. As will become apparent, this power source 10 can, when a power switch 21 is closed, provide operating power for the control devices 14 as well as for the function controller 12, the timing circuit 16 and the initiation device 18. The DC power required by the timing circuit 16 is derived from the power source 10 through a transformer 22, which can provide a stepdown or a stepup in the voltage to the required operating level, and a full wave rectifier 24. For explanatory purposes, it will be assumed that the output terminals 26 and 28 of the full wave rectifier have the indicated polarities.

The function controller 12 serves to start or stop functions of the control devices 14. To do this, the function controller 12 is shown, for demonstration purposes only, to employ relay and contacts with the relay being referred to as a time relay and assigned the numeral 30 and its various contacts being assigned the numerals 32, 34 and 36. The contacts 32 and 36 and the contacts 34 are respectively shown normally open and normally closed for demonstration purposes. As those versed in the art will appreciate these contacts 32, 34 and 36 can have whatever initial setting is desired. This switching function of the time relay 30 can, of course, be accomplished by any of the other well known switches, including solid state switches, magnetic switches, etc. The time relay 30, which has the usual winding, is interconnected between the output terminal 28 of the rectifier 24 and the output of the timing circuit 16 so that when there is an output from the timing circuit 16, the time relay 30 will be energized.

As has been mentioned, the timing circuit 16 provides selective and adjustable time control of the function controller 12 and ultimately the control devices 14. To do this, the timing circuit 16 has a transistor 40 of the PNP type connected in a common emitter configuration. Obviously an NPN type transistor can be employed if the polarity connections to the source are reversed. The transistor 40 is connected across the output terminals 26 and 28 of the rectifier 24 and has in its input, between the base and emitter thereof, an RC network viewed generally at 42. This RC network includes a capacitor 44 connected in series with an adjustable resistor 45 and in parallel with an adjustable resistor 46. A common junction at 48 between the capacitor 44 and the adjustable resistors 45 and 46 are connected by way of a bias resistor 50 to the base of the transistor 40. The capacitor 44 and the adjustable resistor 46 on their opposite sides from this common junction 48, are connected to and held at the potential of the output terminal 26 of the rectifier 24. The emitter of the transistor 40 is also connected to this output terminal 26, such that the base and the emitter will be at substantially the same potential in the absence of a charge on the capacitor 44. Hence, lacking a forward bias, the transistor 40 will be in its non-conductive state so that there will be no current flow to its collector which is connected through the time relay 30 to the other output terminal 28 of the rectifier 24.

To initiate or commence the operation of the timing circuit 16, as mentioned, the initiation device 18 is employed. This device 18 has a manually operable switch 52, which is in series with a control relay 54. Both the switch 52 and the control relay 54 are in turn both connected across the AC power supply 20. The control relay 54 can be similar to the time relay 30 including the usual winding, which when energized by the current therethrough, will close its normally open contacts 56. These contacts 56 connect the common junction 48 or the base side of the capacitor 44 to the output terminal 28 of the rectifier 24 through the adjustable resistor 45 so that the RC network 42 will become operative. The capacitor 44 will then be charged at a rate determined by the RC time constant, which can be varied by the adjustment of the variable resistor 45, and to a level which will provide the forward bias for the transistor 40 so that it will be turned on and assume its conductive state. The initiation device 18 optionally includes a teletale lamp 58 in parallel with the control relay 54 and will be illuminated when the switch 52 is closed.

The control relay 54 can optionally operate one or more contacts 59 to one or more associated control devices 14. This would provide an instantaneous on or off function control determined by whether the contacts 59 are normally closed or open.

Describing now the operation of the FIG. 1 system. The entire system is rendered ready for operation by closing the power switch 21. Next the manually operable switch 52 is closed so as to energize the control relay 54 and close the normally open contacts 56 in the timing circuit 16 and open the normally closed contacts 59 to one of the devices 14. This will cause the capacitor 44 to charge, as just described, until the transistor 40 is forwardly biased enough to turn on and initiate current flow therethrough and by way of its collector through the time relay 30. The time relay 30 will be then energized and cause the normally open contacts 32 and 36 to be closed and the normally closed contacts 34 to be opened. The control device 14 associated with the non-closed contacts 32 will receive its power from the power source 10 and of course there can be more than one device 14 deriving such power from the power source 10. The devices 14 associated with the normally open contacts 36 and the normally closed contacts 34 are illustrated as having their own power sources and will assume whatever function is assigned to them.

With the FIG. 1 system operating in the foregoing manner, the time delay after the manually operable switch 52 is opened starts as soon as the switch 52 is opened. This cuts off the supply of current to the control relay 54 and it will be de-energized and open its contacts 56 and reclose its contacts 59. The control device 14 associated with the normally closed contacts 59 will instantly have its power turned on. At the same time the charge on the capacitor 44 will commence to be dissipated through the adjustable resistor 46 at a rate determined by the RC time constant. The time for this discharge can be varied by the adjustable resistor 46 so that after the desired time delay interval, the transistor 40 will have lost its forward bias and turn off the current flow therethrough. The time relay 30 will accordingly be de-energized and the contacts 32 and 36 and the contacts 34 will respectively revert to their normally open and normally closed positions to either stop the functions of the devices 14 associated with the normally open contacts 32 and 36 or initiate the function of the device associated with the normally closed contacts 34. Hence, it can be seen that there is both a time delay in the stop function of some of the control devices 14 and the start function of others. Furthermore, the contacts 59 operated by the control relay 54 can provide instantaneous on or off functions determined by whether the contacts 59 are initially normally closed or normally open.

Figure 2:
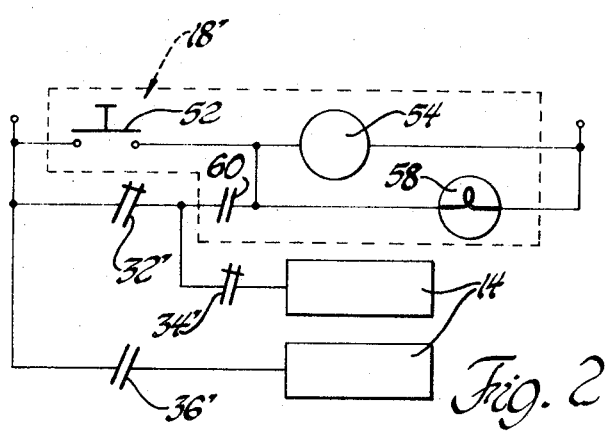
FIG. 2 is a schematic circuit diagram of a part of circuitry that can be utilized with the FIG. 1 control system to provide time delay of the turn-on of a function.

Referring next to FIG. 2, this circuitry includes an initiation device 18' which can replace the initiation device 18 in the FIG. 1 system. The FIG. 2 circuitry has the same numerals assigned to those parts which are the same as those used in the FIG. 1 system and the same numerals with a prime (') assigned to those parts which are similar. The initiation device 18' provides a time delay after closing the manually operable switch 52. Upon closing this switch 52, the control relay 54 is energized to close its contacts 56. In the FIG. 2 circuitry there are hold-in relay contacts 60, which are also closed and being in series with normally closed contacts 32', which are operated by the time relay 30, will cause the control relay 54 to remain energized even though the manually operable switch 52 is moved to its open position. Consequently, the timing circuit 16, in the way previously explained, will become operative and the capacitor 44 will be charged to the level at which the forward bias will cause the transistor 40 to turn on. The time required for this charge of the capacitor 44, of course, is determined by the time constant which can be, as mentioned, altered by adjustment of the adjustable resistor 45. Thus, when the transistor 40 conducts, the time relay 30 will become operative to open the normally closed contacts 32' and 34' and close the normally open contacts 36'. The opening of the contacts 32' de-energizes the control relay 54 and the closing of the contacts 36' will start operation of the associated control device 14 but after this time delay.

From the foregoing it will be appreciated that with a minimum of components all of which can be arranged in a single unit and easily modulized, trouble shooting for malfunctions is easily carried out and the individual units although they may be repaired, can if expense is justified, be discarded. Standby components can be readily inserted in place of the malfunctioning components. The controlled devices 14 can, after operation of the initiation device 18 be instantly turned on or off or be turned on or off after a time delay.

What is claimed is:

1. A control system for a series of control devices comprising an AC power source, means converting the AC power to DC power, a controller for the control devices, the controller including switch means arranged to open and close when the controller is respectively rendered operative and inoperative, timing means for operating the controller in accordance with a predetermined time scheme, the timing means including a plural operating state transistor having an RC network in the input thereof and the controller in the output thereof so as to render the controller operative and inoperative in the respective conductive and non-conductive states thereof, the transistor including base, emitter, and collector electrodes with the base and the emitter electrodes coupled to one side of the converting means and the collector electrode coupled through the controller to the other side of the converting means, the RC network including parallel connected resistive and capacitive elements coupled between the emitter and base electrodes and having a common junction therebetween coupled to the base electrode, and means initiating the operation of the RC network, the initiating means being coupled across the AC power source and including a manually operable switch and in series therewith a control relay having control relay contacts interconnecting the collector electrode and the common junction so that when the manually operable switch is closed to cause the control relay to be energized by the AC power source and thereby close the control relay contacts, a forward bias is imposed on the transistor for biasing the transistor to the conductive state thereof and, when the selectively operable switch is operated to cause the control relay to be de-energized to open the control relay contacts, the RC network is caused to maintain the forward bias on the transistor for a certain time interval after which the transistor will return to the non-conductive state thereof, the initiating means also including in series with the switch means and in parallel with the manually operable switch hold-in relay contacts actuatable by the contact relay when energized to continue to couple the control relay to the AC power source after the manually operable switch is opened and until the controller is rendered inoperative.

2. A control system for a series of control devices comprising an AC power source, means converting the AC power to DC power, a controller for the control devices, the controller including switch means arranged to open and close when the controller is respectively rendered operative and inoperative, timing means for operating the controller in accordance with a predetermined time scheme, the timing means including a plural operating state transistor having an RC network in the input thereof and the controller in the output thereof so as to render the controller operative and inoperative in the RESPECTIVE conductive and non-conductive states thereof, the transistor including a plurality of electrodes and having two of the plurality of electrodes coupled to one side of the converting means and another of the plurality of electrodes coupled through the controller to the other side of the converting means, the RC network including parallel connected resistive and capacitive elements coupled between the said two of the plurality of electrodes and having a common junction therebetween coupled to the said another of the plurality of electrodes, and means initiating the operation of the RC network, the initiating means being coupled across the AC power source and including a manually operable switch and in series therewith a control relay having control relay contacts interconnecting one of the said two of the plurality of electrodes and the common junction so that, when the manually operable switch is closed to cause the control relay to be energized by the AC power source and thereby close the control relay contacts, a forward bias is imposed on the transistor for biasing the transistor to the conductive state thereof and, when the selectively operable switch is operated to cause the control relay to be de-energized to open the control relay contacts, the RC network is caused to maintain the forward bias on the transistor for a certain time interval after which the transistor will return to the non-conductive state thereof, the initiating means including in series with the switch means and in parallel with the manually operable switch hold-in relay contacts actuatable by the contact relay when energized to continue to couple the control relay to the AC power source after the manually operable switch is opened and until the controller is rendered inoperative.

* * * * *